(12) United States Patent
Huh et al.

(10) Patent No.: US 8,576,783 B2
(45) Date of Patent: *Nov. 5, 2013

(54) APPARATUS AND METHOD FOR UPLINK SCHEDULING IN A COMMUNICATION SYSTEM

(75) Inventors: Hoon Huh, Seongnam-si (KR); Min-Hee Cho, Suwon-si (KR); Jae-Hee Cho, Seoul (KR); In-Seok Hwang, Seoul (JP); Jang-Hoon Yang, Seongnam-si (KR); Soon-Young Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 1752 days.

This patent is subject to a terminal disclaimer.

(21) Appl. No.: 11/603,731

(22) Filed: Nov. 22, 2006

(65) Prior Publication Data

US 2007/0115880 A1 May 24, 2007

(30) Foreign Application Priority Data

Nov. 22, 2005 (KR) .......................... 10-2005-112056

(51) Int. Cl.
*H04W 4/00* (2009.01)
*H04W 72/00* (2009.01)
*H04B 7/212* (2006.01)
*H04B 7/00* (2006.01)

(52) U.S. Cl.
USPC ........... 370/329; 370/348; 370/341; 455/450; 455/451; 455/452.1; 455/509

(58) Field of Classification Search
USPC ................. 370/329, 348, 347, 345, 343, 341; 455/450, 451, 452, 453, 509, 511, 512, 455/514, 515, 516, 517, 510
See application file for complete search history.

(56) References Cited

U.S. PATENT DOCUMENTS

| | | | | |
|---|---|---|---|---|
| 5,640,677 | A | * | 6/1997 | Karlsson ....................... 455/434 |
| 5,822,696 | A | * | 10/1998 | Bergkvist ...................... 455/436 |
| 7,047,016 | B2 | * | 5/2006 | Walton et al. .............. 455/452.1 |
| 7,139,274 | B2 | * | 11/2006 | Attar et al. ................. 370/395.4 |
| 7,558,535 | B2 | * | 7/2009 | Cho et al. ........................ 455/69 |
| 7,719,973 | B2 | * | 5/2010 | Abedi ........................... 370/230 |
| 7,801,490 | B1 | * | 9/2010 | Scherzer .................... 455/67.13 |
| 2002/0086707 | A1 | * | 7/2002 | Struhsaker et al. ........... 455/561 |
| 2002/0177447 | A1 | * | 11/2002 | Walton et al. ................. 455/452 |
| 2004/0185868 | A1 | * | 9/2004 | Jain et al. ...................... 455/453 |
| 2006/0182022 | A1 | * | 8/2006 | Abedi ........................... 370/229 |
| 2008/0117881 | A1 | * | 5/2008 | Golitschek Edler Von Elbwart et al. ............................ 370/335 |

FOREIGN PATENT DOCUMENTS

KR 1020050052494 6/2005
WO WO 2005/096522 10/2005

* cited by examiner

*Primary Examiner* — Wesley Kim
(74) *Attorney, Agent, or Firm* — The Farrell Law Firm, P.C.

(57) ABSTRACT

An uplink scheduling apparatus and method in a communication system are provided. In the uplink scheduling method, a scheduling metric is calculated for each Mobile Station (MS). An MS with a high priority level is selected according to the calculated scheduling metric. The number of subchannels and a product of a modulation order and coding rate (MPR) are extracted according to input variables for the selected MS. The number of subchannels to be allocated to the selected MS is determined according to the MPR and the subchannels are allocated to the selected MS. The scheduling metric is updated for the each MS.

24 Claims, 7 Drawing Sheets

APPARATUS AND METHOD FOR UPLINK SCHEDULING IN A COMMUNICATION SYSTEM

PRIORITY

This application claims priority under 35 U.S.C. §119 to an application filed in the Korean Intellectual Property Office on Nov. 22, 2005 and assigned Serial No. 2005-112056, the contents of which are incorporated herein by reference.

BACKGROUND OF THE INVENTION

1. Field of the Invention

The present invention relates generally to a scheduling apparatus and method in a communication system, and in particular, to an apparatus and method for uplink scheduling in a communication system.

2. Description of the Related Art

Providing services with diverse Quality of Service (QoS) levels at about 100 Mbps to users is actively being studied for a $4^{th}$ Generation (4G) communication system, which is a future-generation communication system. Particularly, there is ongoing research concerning the development of a new communication system that supports high-speed services by ensuring mobility and QoS to a Wireless Local Area Network (WLAN) supporting relatively high data rates and a Wireless Metropolitan Area Network (WMAN).

Institute of Electrical and Electronics Engineers (IEEE) 802.16a and IEEE 802.16e communication systems adopt Orthogonal Frequency Division Multiplexing/Orthogonal Frequency Division Multiple Access (OFDM/OFDMA) for the physical channels of the WMAN system in order to support a broadband transmission network. Because a physical channel signal is transmitted on a plurality of sub-carriers in OFDM/OFDMA in the WMAN system, IEEE 802.16a and IEEE 802.16e system enable high-speed data transmission. In effect, IEEE 802.16a and IEEE 802.16e are OFDM/OFDMA-Broadband Wireless Access (BWA) communication systems.

IEEE 802.16a considers only a single-cell structure without regards to the mobility of Subscriber Stations (SSs). In contrast, IEEE 802.16e supports the mobility of the SS to the IEEE 802.16a communication system. For the IEEE 802.16e system to ensure the mobility of SSs in a multi-cell environment, the operations of the SS and the Base Station (BS) must be modified. There is ongoing study, particularly regarding handover for the SS in the multi-cell structure. Hereinafter, a Mobile SS is called an MS.

Figure 1:
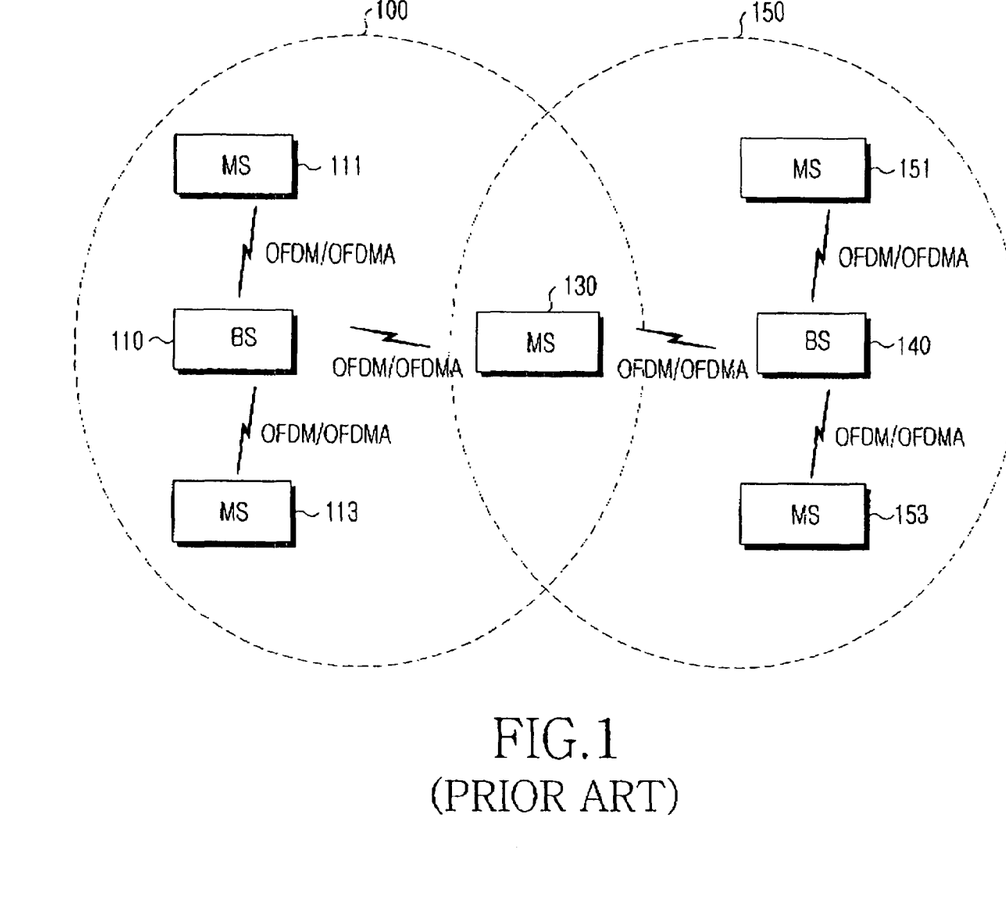
FIG. 1 illustrates the configuration of a typical Broadband Wireless Access (BWA) communication system.

FIG. 1 illustrates the configuration of a typical BWA communication system. Referring to FIG. 1, the BWA communication system is configured in a multi-cell structure. Thus, it includes cells 100 and 150, a BS 110 that covers the cell 100, a BS 140 that covers the cell 150, and a plurality of MSs 111, 113, 130, 151 and 153. Signaling between the BSs 110 and 140 and the MSs 111, 113, 130, 151 and 153 is based on OFDM/OFDMA.

In OFDMA provided for the BWA communication system, subchannels include subcarriers, which constitute one OFDM symbol, and a plurality of OFDM symbols form one frame.

Figure 2:
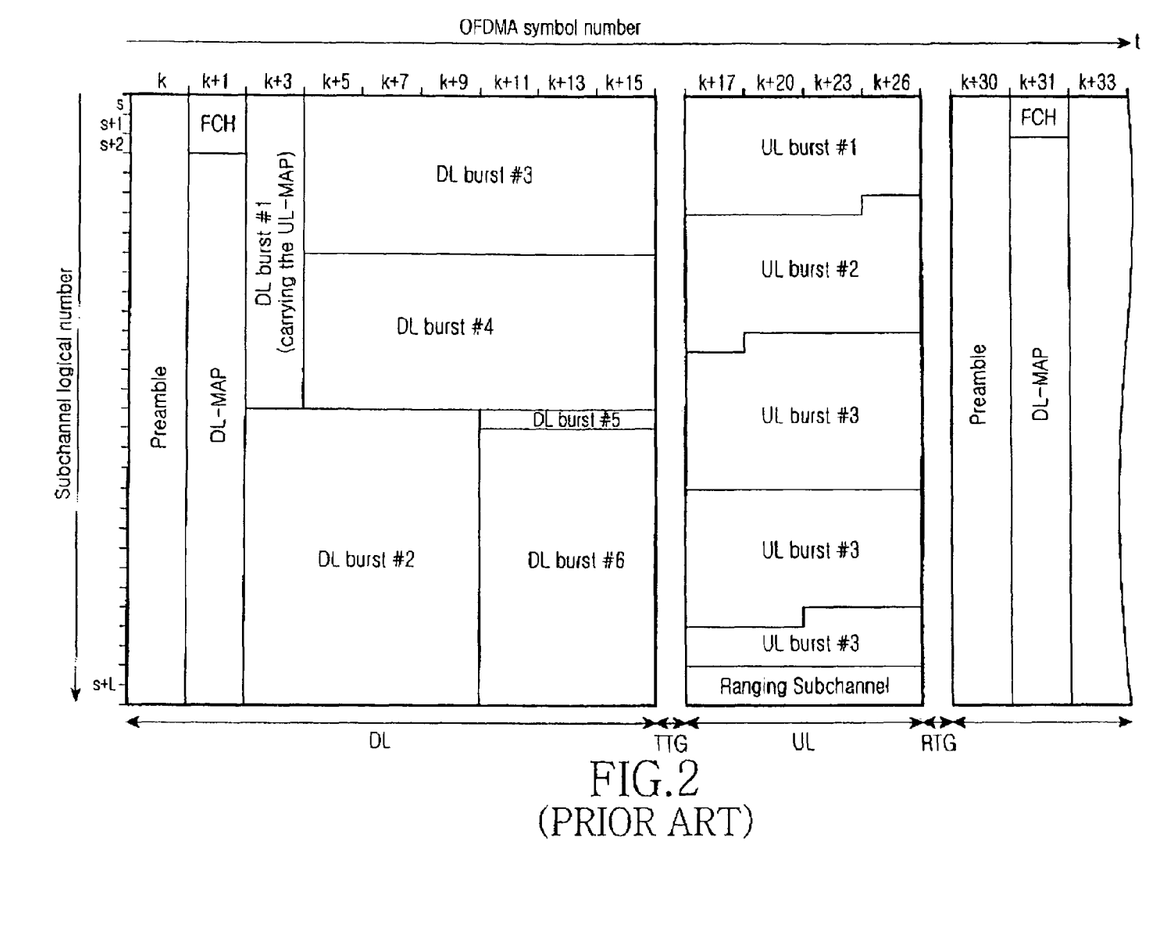
FIG. 2 illustrates the structure of a DownLink/UpLink frame in the typical BWA communication system.

FIG. 2 illustrates a structure of a data frame in the typical BWA communication system. Particularly, the data frame is an UpLink (UL)/DownLink (DL) frame for an Orthogonal Frequency Division Multiple Access-Time Division Duplex (OFDMA-TDD) BWA communication system.

Referring to FIG. 2, the data frame is divided into a DL frame and a UL frame in time. A transmission gap, called a Transmit/receive Transition Gap (TTG), is interposed for transition from the downlink to the uplink, and a transmission gap, called a Receive/transmit Transition Gap (RTG), is interposed for transition from the uplink to the downlink. The horizontal axis represents OFDMA symbol numbers and the vertical axis represents the logical number of subchannels.

On the downlink, a preamble resides in a $K^{th}$ OFDMA symbol, for synchronization acquisition, and data information broadcast most common to MSs such as a Frame Control Header (FCH) and a DL-MAP is located in a $(K+1)^{th}$ OFDMA symbol.

The preamble delivers a synchronization signal, i.e. a preamble sequence by which synchronization is acquired between a BS and an MS. That is, the preamble is required for the MS to acquire synchronization to data transmitted by the BS. The MS extracts the synchronization information from the preamble through its MODEM.

The FCH includes two subchannels, carrying basic information about subchannels, ranging, and modulation. An analysis of the FCH indicates the size of the DL-MAP and the frequency reuse factor (referred to as reuse) of the BS, for example, reuse 1 or reuse 2.

The DL-MAP delivers a DL-MAP message. The DL-MAP message has information required for extracting data and providing service provisioning to MSs, such as the positions and sizes of data in the DL frame. Therefore, data can be extracted from the DL frame by analyzing the DL-MAP information.

In $(K+_3)^{th}$ through $(K+15)^{th}$ OFDMA symbols, DownLink bursts (DL bursts) are positioned, for example, as DL burst #1 to DL burst #6. Data is extracted from the DL bursts based on general data information, such as information acquired from the DL-MAP.

On the uplink, UpLink bursts (UL bursts), for example UL burst #1 to UL burst #5, are located in $(K+17)^{th}$ to $(K+26)^{th}$ OFDMA symbols. A Ranging Subchannel also occupies the $(K+17)^{th}$ to $(K+26)^{th}$ OFDMA symbols. Ranging subchannels for ranging are transmitted in the Ranging Subchannel. Data is extracted from the UL bursts based on general data information such as information acquired from an UpLink MAP (UL-MAP), which is delivered in DL burst #1.

Each subchannel is composed of a plurality of subcarriers. Depending on system conditions, one subchannel is composed of a predetermined number of subcarriers. As described above, the IEEE 802.16e OFDMA communication system configures subchannels each being a set of subcarriers according to system condition and allocates resources to a plurality of users (i.e., MSs) by the subchannels.

Figure 3:
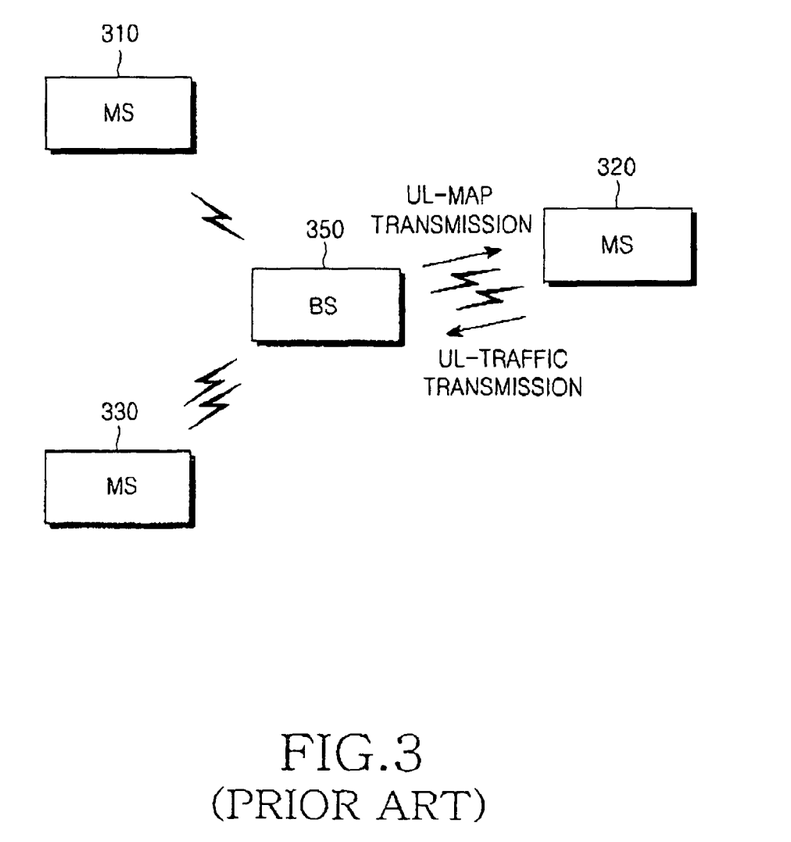
FIG. 3 illustrates uplink traffic transmission in the typical BWA communication system.

FIG. 3 illustrates traffic transmission in the typical BWA communication system. Particularly, a BS 350 allocates uplink resources to, for example, an MS 320 and the MS 320 transmits traffic using the allocated resources.

Referring to FIG. 3, the BS 350 selects an MS (e.g., the MS 320) to allocate resources to from among MSs 310, 320 and 330 within its coverage area by a predetermined scheduling procedure. The BS 350 determines the amount of resources and a Modulation and Coding Scheme (MCS) for the MS 320. Also, the BS 350 determines the position of the resources by which the MS 320 transmits data. This operation is repeated until all uplink resources are allocated.

After scheduling is completed, the BS 350 broadcasts uplink scheduling information indicating the result of the scheduling in a UL-MAP message to all of the MSs 310, 320 and 330 within a cell.

The MSs 310, 320 and 330 receive the UL-MAP message and, if resources have been allocated to them, they transmit traffic at the positions of the allocated resources on the uplink. For example, if the UL-MAP message indicates the existence of resources allocated to the MS 320, then the MS 320 transmits uplink traffic at the position of the allocated resources.

Basically, the BS seeks to maximize radio channel throughput and minimize the transmission delay of traffic in uplink scheduling. Besides, the BS aims to reduce interference with neighboring sectors, reduce UL-MAP overhead, expand cell coverage, reduce the power consumption of the MSs, and maintain stable link performance between the BS and the MSs. Thus, the BS selects an operation method for achieving the above objectives. However, some objectives of the BS scheduling may contradict each other. Hence, the scheduler of the BS attempts to fulfill the objectives appropriately according to their priority levels by adjusting parameters like an MCS level preference and the amount of resources allocated per time.

Yet, there is no specified scheduling method and apparatus for satisfying the above various objectives and that flexibly using weights, in allocating uplink resources through frame-basis uplink scheduling in a broadband mobile communication system, particularly an OFDMA-TDD mobile communication system.

SUMMARY OF THE INVENTION

An object of the present invention is to substantially solve at least the above problems and/or disadvantages and to provide at least the advantages described below. Accordingly, the present invention provides an apparatus and method for efficient uplink scheduling in a communication system.

According to an aspect of the present invention, in an uplink scheduling method for a communication system, an MS having a high channel gain at a given time is selected using downlink channel information. The amount of resources to be allocated and a throughput are determined for the selected MS. The resources are allocated to the selected MS according to the determination.

According to another aspect of the present invention, in an uplink scheduling method for a communication system, a scheduling metric is calculated for each MS. An MS with a high priority level is selected according to the calculated scheduling metric. The number of subchannels and a Modulation order Product coding Rate (MPR) are extracted according to input variables for the selected MS. The number of subchannels to be allocated to the selected MS is determined according to the MPR and the subchannels are allocated to the selected MS. The scheduling metric is updated for each MS.

According to a further aspect of the present invention, in an uplink scheduling method for a communication system, input variables for scheduling and a scheduling metric are updated for each MS in each frame. An MS maximizing the scheduling metric is selected and predetermined bandwidth resources are allocated to the selected MS. If the size of the queue of the selected MS is less than the allocated band resources, a minimum band enough to transmit queued data is allocated to the selected MS. If the queue size is larger than the allocated bandwidth resources, a combination of an MPR and the number of subchannels for the allocated bandwidth resources is determined according to the input variables. The determined number of subchannels is allocated to the selected MS and the number of remaining subchannels is decreased by the number of the allocated subchannels. The scheduling metric is updated for each MS and scheduling is repeated for the remaining subchannels.

According to still another aspect of the present invention, in an uplink scheduling apparatus in a communication system, an UpLink burst receiver receives a data burst from each MS and recovers the received data burst to a packet. A packet processor classifies the packet as a traffic packet or a signaling message and acquires first scheduling information required for scheduling each MS by interpreting the signaling message, if the packet is the signaling message. A scheduler selects an MS to allocate uplink resources to according to the first scheduling information and determines second scheduling information to be allocated to the selected MS. A MAP encoder converts the second scheduling information to a UL-MAP message and transmits the UL-MAP message to the selected MS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention pertains to an apparatus and method for uplink scheduling suitable for an Orthogonal Frequency Division Multiple Access-Time Division Duplex (OFDMA-TDD) communication system. Thus, the present invention provides a scheduling apparatus and method for selecting an MS with a high channel gain at a given time instant using downlink channel information in uplink scheduling and fairly distributing resources to Mobile Stations (MSs) according to the amounts of resources allocated to the MSs and their throughputs.

While the following description is made in the context of an Institute of Electrical and Electronics Engineers (IEEE) 802.16e communication system, for convenience sake, to which the present invention is not limited, it is to be clearly understood that the present invention is applicable to the uplink of any OFDMA-TDD communication system.

Figure 4:
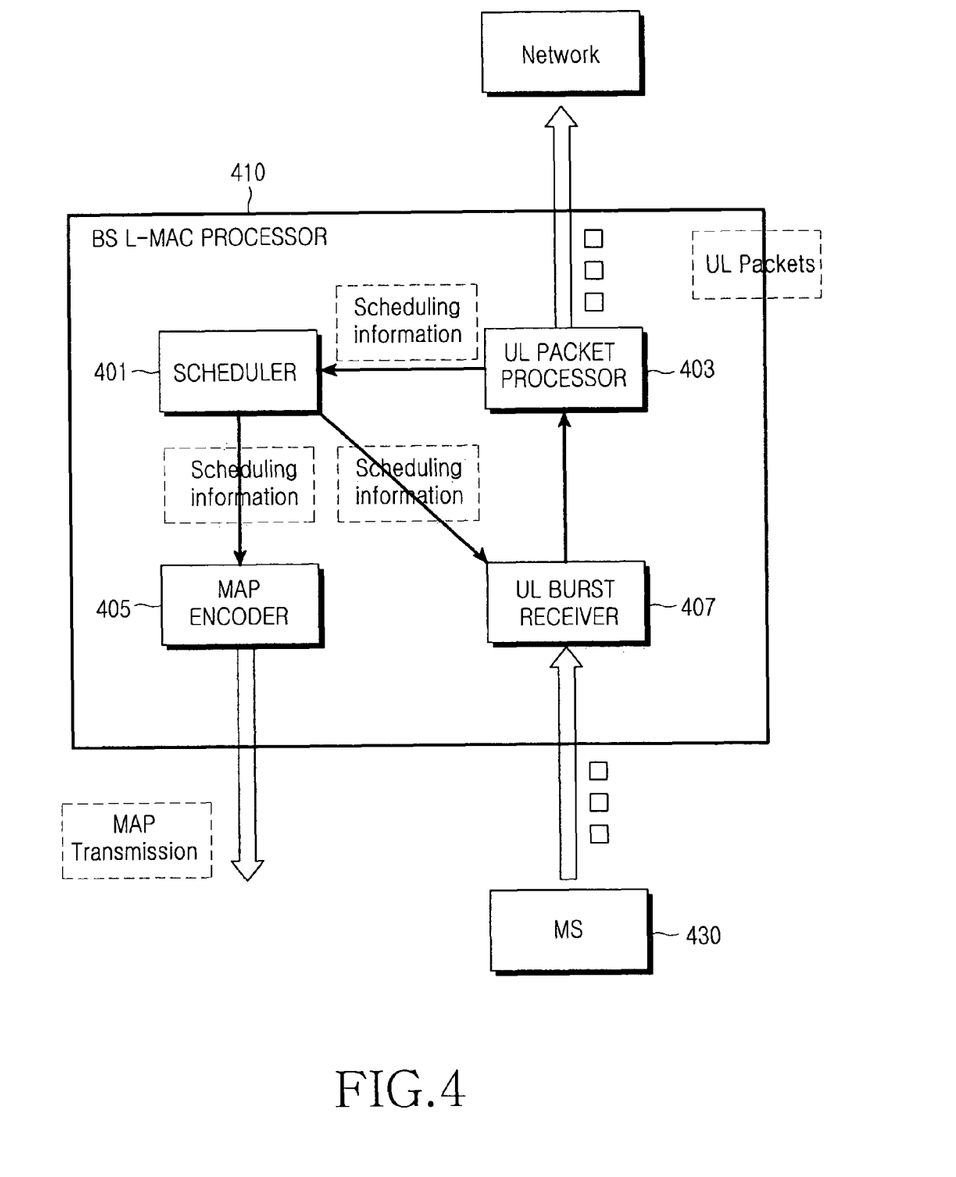
FIG. 4 is a block diagram illustrating a scheduling apparatus in a Broadband Wireless Access (BWA) communication system according to the present invention.

FIG. 4 is a block diagram illustrating an uplink scheduling apparatus in a BWA communication system according to the present invention. The scheduling apparatus is a BS uplink Low Medium Access Control (L-MAC) processor including a scheduler according to the present invention.

Referring to FIG. 4, a BS uplink L-MAC processor 410 includes a scheduler 401, an UpLink (UL) packet processor 403, a MAP encoder 405, and a UL burst receiver 407.

In operation, the UL burst receiver 407 receives a data burst from each MS such as an MS 430 and recovers the data burst to a predetermined packet form.

The packet processor 403 classifies packets received from the UL burst receiver 407 into traffic packets or signaling messages (e.g., MAC messages). In case of traffic packets, the packet processor 403 transmits the traffic packets to a network. In case of signaling messages, the packet processor 403 acquires scheduling information required for scheduling of the MS 430 by interpreting the signaling messages and provides the scheduling information to the scheduler 401. In each frame, the packet processor 403 acquires messages associated with scheduling by interpreting MAC messages and provides them to the scheduler 401.

The scheduler 401 selects the MS 430 to allocate uplink resources to using the scheduling information. Then the scheduler 401 determines scheduling information including the position of the resources and a Modulation and Coding Scheme (MCS) level and transmits the scheduling information to the UL burst receiver 407 and the MAP encoder 405.

The MAP encoder 405 converts the scheduling information to a UL-MAP message and transmits the UL-MAP message to the MS 430.

The UL burst receiver 407 stores the scheduling information and processes a data burst from the MS 430 based on the scheduling information when the MS 430 transmits the data burst.

Figure 5:
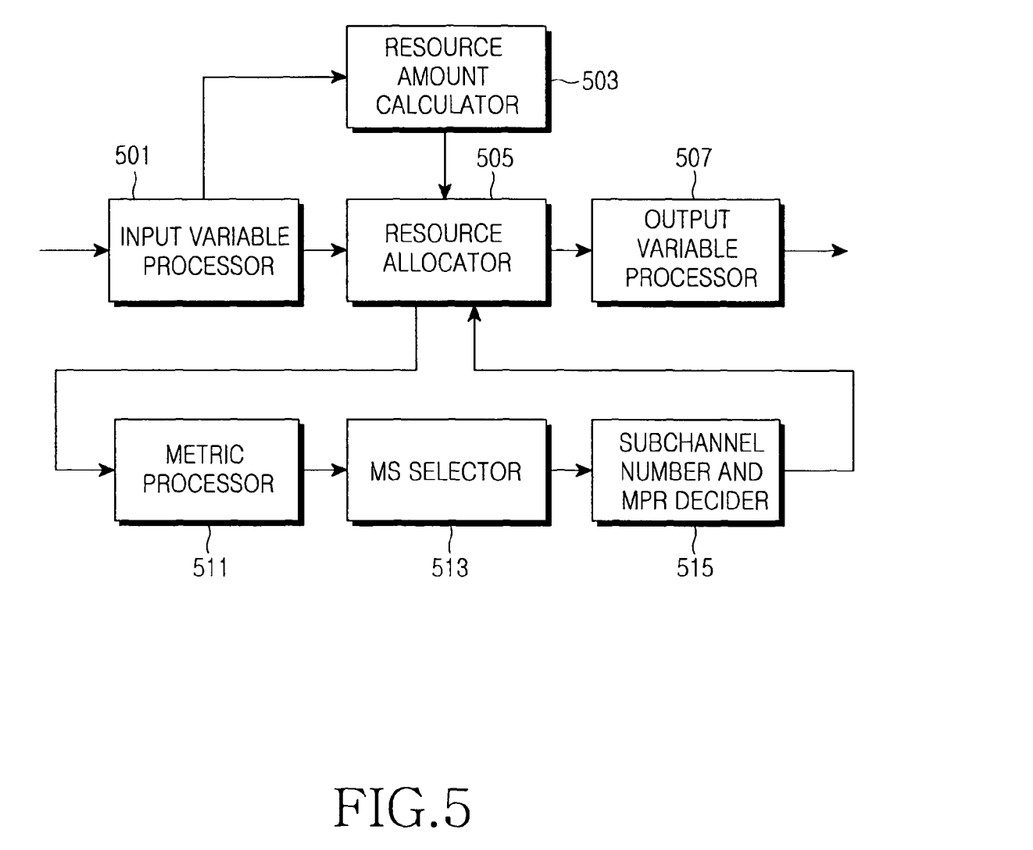
FIG. 5 is a block diagram illustrating a scheduler in the BWA communication system according to the present invention.

FIG. 5 is a block diagram illustrating the OFDMA-TDD uplink scheduler according to the present invention. Referring to FIG. 5, the scheduler includes an input variable processor 501, a resource amount calculator 503, a resource allocator 505, an output variable processor 507, a metric processor 511, an MS selector 513, and a subchannel number and Modulation order Product coding Rate (MPR) decider 515.

The input variable processor 501 receives predetermined signaling messages (e.g., MAC messages) in each frame from the packet processor 403 illustrated in FIG. 4, and updates input variables for scheduling of the scheduler using the MAC messages.

Specifically, the packet processor 403 classifies messages associated with scheduling by interpreting MAC messages in each frame and provides the messages to the scheduler. Thus, the input variable processor 501 updates the input variables including the number of control channels needed for scheduling, and a power headroom, queue size, MPR, throughput, and the number of allocated subchannels for each MS according to the received messages, and provides the processed input variables to the resource amount calculator 503 and the resource allocator 505. The input variables will be described below in greater detail.

The resource amount calculator 503 receives a variable indicating the number of control channels for scheduling from the input variable processor 501 and calculates the amount of resources in correspondence with the number of control channels.

The resource allocator 505 determines the amounts and positions of resources to be allocated according to the input variables received from the input variable processor 501 and the calculated resource amount received from the resource amount calculator 503. Then the resource allocator 505 actually allocates resources to control channels and traffic channels in correspondence with the amounts and positions of resources.

The metric processor 511 calculates metrics that prioritizes MSs for scheduling. How the metric is calculated depends on a fairness level and whether downlink channel information is utilized.

The MS selector 513 prioritizes the MSs according to the metrics and selects MSs to allocate resources to according to the priority levels.

The subchannel number and MPR decider 515 determines the numbers of subchannels and MPRs for the resources to be allocated to the selected MSs by a scheduling method. An MPR is the product of a modulation order and a coding rate. Specifically, the subchannel number and MPR decider 515 makes the determination according to the Signal-to-Interference and Noise Ratio (SINR) and headroom requirement of each MPR.

The output variable processor 507 processes variables decided by scheduling, i.e., the IDentifiers (IDs) of the selected MSs, the numbers of subchannels allocated to the MSs, and the MCS levels for the MSs in the form of an actual message.

Figure 6:
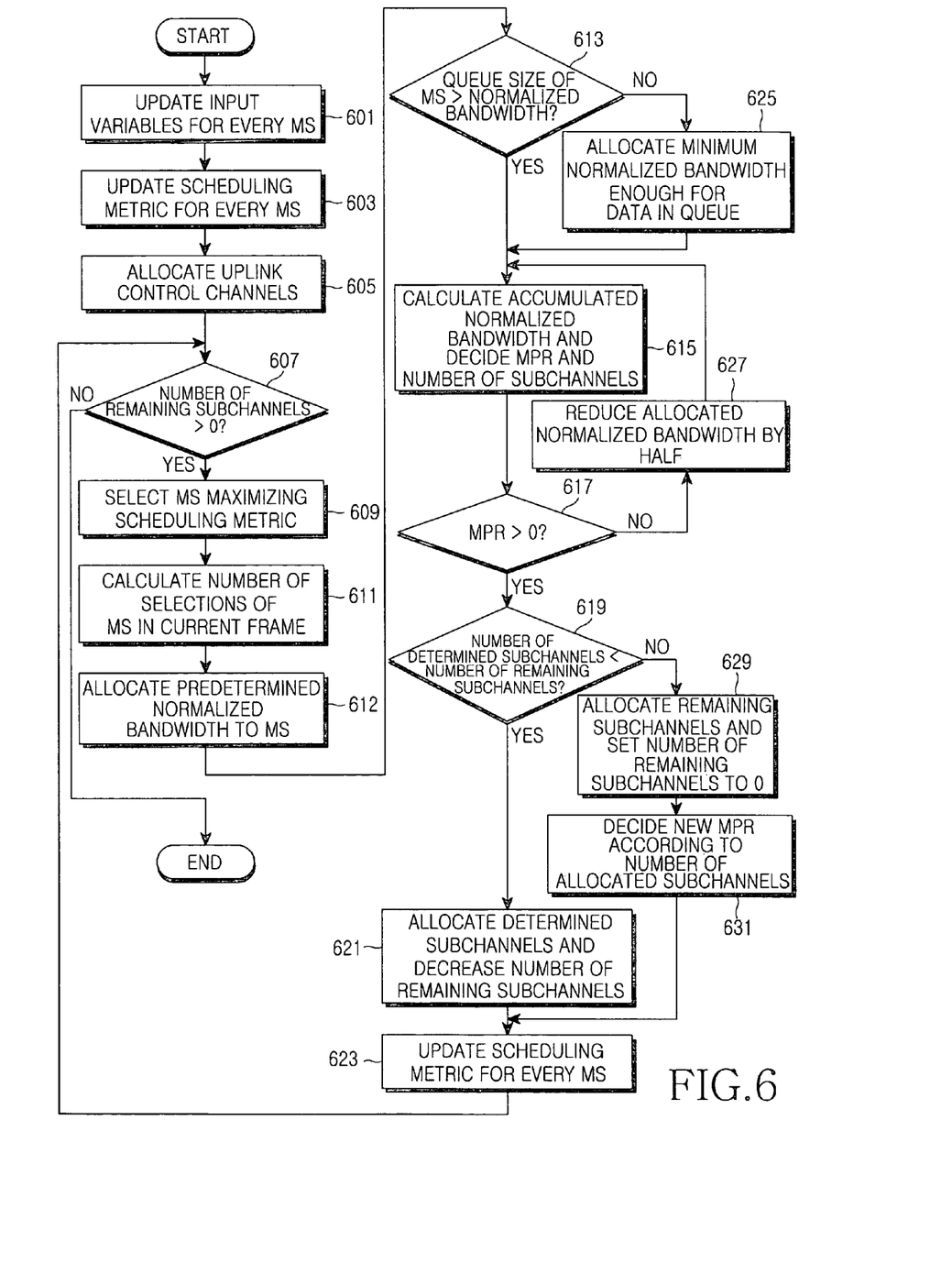
FIG. 6 is a flowchart illustrating an uplink scheduling method in the BWA communication system according to the present invention.

FIG. 6 is a flowchart illustrating an uplink scheduling method in the BWA communication system according to the present invention. Referring to FIG. 6, a description will be set forth of an uplink scheduling method in the OFDMA-TDD BWA communication system according to the present invention. First, the input variables used in the uplink scheduler according to the present invention are defined as follows. The input variables are Power Headroom (Headroom), Normalized Headroom (Headroom_nor), MPR, Queue Size (Queue_Size), Normalized BandWidth Allocation (Alloc_Nor_BW), the Instant value of the number of Allocated Subchannels (Inst_Alloc_Sch), the Average number of Allocated Subchannels (Avg_Alloc_Sch), Instant Throughput (Inst_Throughput), Average Throughput (Avg_Throughput), downlink Channel Quality Information (CQI) for each MS, Instant DownLink MPR (Inst_DL_MPR), and Average DownLink MPR (Avg_DL_MPR).

Power Headroom (Headroom): power headroom when the MS transmits a data burst at a current MCS level using a current number of subchannels.

Normalized Headroom (Headroom_nor): power headroom to which the power headroom information is calculated with respect to a predetermined MCS level and a predetermined number of subchannels, for example, Quadrature Phase Shift Keying (QPSK), code rate R=1/2, and one subchannel. The normalized headroom is given as set forth below in Equation (1).

$$\text{Headroom\_Nor} = \text{Headroom} + 10 \log 10(N\_Alloc\_Subch) + CINR\_MCS - CINR\_QPSK\ 1/2 \quad (1)$$

MPR: the product of a modulation order and a code rate, calculated on the basis of an MCS level used for the MS. For example, given a modulation order of 2, i.e. QPSK and R=1/2, the MPR is 1. For a modulation order of 4, i.e. 16-ary Quadrature Amplitude Modulation (16QAM) and R=3/4, the MPR is 3.

Queue Size (Queue_Size): the amount of data buffered in a transmission buffer for each MS, estimated by the scheduler. The Queue size increases/decreases depending on a bandwidth request from the MS and the scheduling result. If the bandwidth request is transmitted, the Queue size is increased as much. If resources are allocated by the scheduler, the Queue size is reduced as much as the allocated resources.

Normalized Bandwidth: the number of subchannels required for transmission in QPSK at R=1/2.

Normalized DandWidth Allocation (Alloc_Nor_BW): a normalized bandwidth value allocated to the MS by scheduling. The actual number of required subchannels is Alloc_Nor_BW/MPR.

Instant value of the number of allocated subchannels (Inst_Alloc_Sch): the actual number of subchannels allocated to the MS at a scheduling time instant.

Average number of Allocated Subchannels (Avg_Alloc_Sch): the moving average of Inst_Alloc_Sch for frames corresponding to a time constant T_avg. The moving average is to sum the moving average of previous T frames counted from one frame before the present and the current new input after weighting them with (T-1)/T and 1/T, respectively in order to approximate the average of the T current and previous frames. The Average number of Allocated Subchannels (Avg_Alloc_Sch) is set forth in Equation (2) below.

$$\text{Avg\_Alloc\_Subch}[n] = \frac{T\_avg - 1}{T\_avg} \cdot \text{Avg\_Alloc\_Subch}[n-1] + \frac{1}{T\_avg} \cdot \text{Inst\_Alloc\_Subch} \quad (2)$$

where n denotes a scheduling time index that increases each time scheduling is performed.

Inst_Throughput: the amount of resources allocated to the MS at a scheduling time, expressed as a normalized bandwidth allocation value. If no resources are allocated, the instant throughput is 0.

Avg_Throughput: the moving average throughput for each MS for frames corresponding to the moving average time constant T_avg. The Avg_Throughput is set forth in Equation (3) below, $$\text{Avg\_Throughput}[n] = \frac{T\_avg - 1}{T\_avg} \cdot \text{Avg\_Throughput}[n-1] + \frac{1}{T\_avg} \cdot \text{Inst\_Throughput} \quad (3)$$

where n denotes a scheduling time index that increases each time scheduling is performed.

Downlink CQI for each MS: a CQI updated with a CQI received on an uplink CQI Channel (CQICH) allocated to the MS so that the MS reports the SINR or Channel-to-Interference and Noise Ratio (CINR) measurement of a downlink channel.

Instant DownLink MPR (Inst_DL_MPR): a maximum MPR that can be allocated on the downlink according to the CQI. The downlink instant MPR requires a table listing required CINRs for MPRs.

Average DownLink MPR (Avg_DL_MPR): the moving average MPR of Inst_DL_MPR for frames corresponding to a time constant T_DL. The Average DownLink MPR is set forth in Equation (4) below, $$\text{Avg\_DL\_MPR}[n] = \frac{T\_DL - 1}{T\_DL} \cdot \text{Avg\_DL\_MPR}[n-1] + \frac{1}{T\_DL} \cdot \text{Inst\_DL\_MPR} \quad (4)$$

where n denotes a scheduling time index that increases each time scheduling is performed.

FIG. 6 is a flowchart illustrating an uplink scheduling method in the OFDMA-BWA communication system according to the present invention.

In accordance with the uplink scheduling method, MSs are prioritized using the above-described input variables, MSs are selected according to the priority levels, for scheduling, and MCS levels, the amounts of resources to be allocated, and the positions of the resources are determined for the MSs. This procedure will be described below.

A. Update Input Variables for Each MS in Scheduler (Step 601)

In step 601, MAC messages are received in each frame and the input variables are updated based on the MAC messages. Specifically, the scheduler updates the input variables including the number of control channels required for scheduling, and a power headroom, queue size, MPR, throughput, and the number of allocated subchannels for each MS.

B. Update Scheduling Metric for Each MS (Step 603).

In step 603, a scheduling metric is updated on an MS basis. The scheduling metric can be given as the product of a channel metric C(n) and a fairness metric F(n), as set forth in Equation (5) below.

$$\text{Metr}(n) = \{C(n)\}^\alpha \cdot \{F(n)\}^\beta \quad (5)$$

where $\alpha$ and $\beta$ are weights for C(n) and F(n), respectively. If $\alpha$ and $\beta$ are 0s, scheduling is not considered for an $n^{th}$ MS.

The channel metric C(n) is the ratio of an instant downlink MPR to an average downlink MPR, calculated from a CQI representing downlink channel quality. The channel metric C(n) is set forth in Equation (6) below.

$$C(n) = \frac{\text{Inst\_DL\_MPR}[n]}{\text{Avg\_DL\_MPR}[n]} \quad (6)$$

In general, a communication system does not continually measure uplink channel quality. Yet, the TDD system can utilize the quality of a downlink channel for the uplink based on downlink-uplink channel symmetry. Although downlink and uplink channels are symmetrical, they differ in interference and noise level. Therefore, an absolute CQI cannot be utilized. Simply, literal downlink SINR or CINR measurements cannot be used in deciding an uplink MPR or allocating uplink resources.

Hence, the present invention utilizes a relative change in the downlink channel quality. When an instant channel quality is higher than its moving average, a corresponding MS is treated with priority such that a time when the downlink channel is in a good status is fully utilized. For this purpose, an SINR or CINR is derived from a CQI and then converted to an equivalent downlink MPR. Then a relative ratio between the instant value and average of the MPR is used as a metric. This will be described with reference to FIG. 7.

Figure 7:
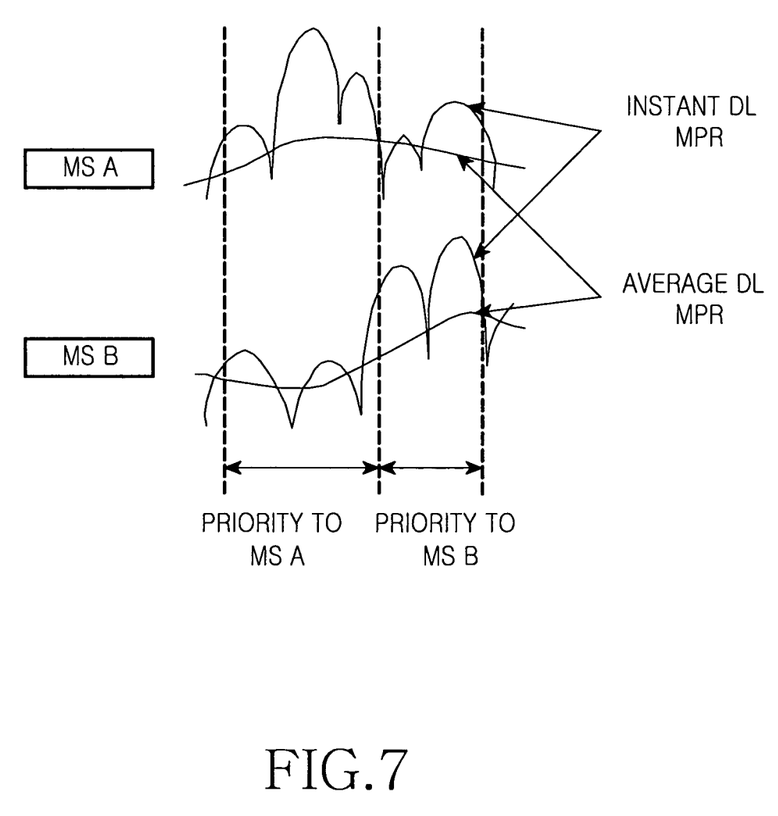
FIG. 7 illustrates a method for calculating a channel metric in the BWA communication system according to the present invention.

FIG. 7 illustrates a channel metric calculation method in the BWA communication system according to the present invention. Referring to FIG. 7, the instant downlink MPR varies with channel quality. When the instant downlink MPR is higher than the average downlink MPR, i.e. at the moment when the channel quality becomes better on the time axis, priority is given to the MS. Sensitivity to the channel metric depends on the time constant T_DL for calculating Avg_DL_MPR. As T_DL increases, the sensitivity to the instant channel value increases and as T_DL decreases, the sensitivity to the instant channel value decreases.

The fairness metric F(n) is the product of a subchannel number fairness metric, a throughput fairness metric, and a queue size metric according to a fairness criterion for the MSs, as shown in Equation (7) below.

$$F(n) = \left(\frac{1}{\text{Avg\_Alloc\_Sch}[n]}\right)^a \cdot \left(\frac{1}{\text{Avg\_Throughput}[n]}\right)^b \cdot (\text{Queue\_Size}[n])^c \quad (7)$$

where a, b and c are weights for the respective terms.

As noted from Equation (7), the subchannel number fairness metric prioritizes the MSs such that all the MSs can receive the same number of subchannels on the average irrespective of their MPRs. Priority is given to an MS with a small Avg_Alloc_Sch value. Given the same number of subchannels, an MS with a high Normalized headroom can be allocated with a higher MPR. That is, more resources are allocated to an MS in a good uplink channel status. Sensitivity to the fairness is determined by the time constant T_avg for Avg_Alloc_Sch. As T_avg decreases, the fairness is guaranteed for a shorter time.

The throughput fairness metric prioritizes the MSs such that all the MSs have the same throughput on the average. An MS with a small Avg_Throughput is treated with priority. Since the throughput fairness metric is independent of the channel environments or average CINRs of the MSs, a special consideration is needed for an MS that is not allocated a bandwidth due to limited transmit power. Sensitivity to the fairness is determined by the time constant T_avg for Avg_Throughput. As T_avg decreases, the fairness is guaranteed for a shorter time.

The queue size metric gives priority to an MS having much transmission data in its traffic buffer so as to ensure an equal latency level to all the MSs irrespective of their traffic amounts. Preferably, resources are allocated in proportion to the speed of traffic generation in an MS.

C. Allocate Uplink Control Channels (Step 605)

In step 605, allocation of uplink control channels for signaling and transmitting control signals precedes traffic scheduling.

D. Select MSs for Scheduling and Allocate Default Normalized Bandwidths (Step 607 Through Step 611).

In step 607, the scheduler determines whether the remaining resources, i.e. the number of the remaining subchannels after the control channel allocation is 0. If the number of the remaining subchannels is not 0, the scheduler selects an MS that maximizes the scheduling metric in step 609 and calculates the number of selections of the MS in the current frame in step 611.

More specifically, the remaining resources from allocating the control channels are allocated as traffic channels by scheduling. An MS that maximizes the scheduling metric of Equation (5) is selected and a normalized bandwidth is allocated to the MS. If resources still remain, another MS maximizing the scheduling metric is selected and a subchannel is allocated to the MS. This operation is repeated until no resources remain. In this way, scheduling is performed on the basis of a predetermined bandwidth using the normalized bandwidth according to an MCS level and the number of subchannels, thereby facilitating fairness guarantee among the MSs, scheduler flexibility, and efficient decision of the MPR and the number of subchannels.

E. Process in Case of at least Two Selections of MS in Frame Scheduling Period (Step 612).

When an MS is selected at least two times during one frame scheduling period, the scheduler determines a new MPR and the number of subchannels, neglecting the previously determined MPR and number of subchannels for the MS in step 612.

The MS is allocated a normalized bandwidth corresponding to the number of subchannels preset by the system, N_sch_default each time the MS is selected. The MS eventually gets N_selxN_sch_default normalized bandwidths. If the MS gets at least two normalized bandwidths, i.e. the MS is selected at least two times during the frame scheduling period, the previous MPR and number of subchannels allocated to the MS are neglected and instead, an MPR and the number of subchannels is newly determined for the MS in correspondence with final allocated normalized bandwidths.

The allocated normalized bandwidth does not refer to the number of physical subchannels, but the right to be allocated resources for transmitting particular data. Actually allocated resources can be determined in various ways, considering the numbers of subchannels and MCS levels in combination. For example, if 10 normalized bandwidths are allocated, 10 subchannels are actually allocated in QPSK at R=1/2, or 5 subchannels in 16QAM at R=1/2.

F. Process in Case of Queue Size of Selected MS Being Smaller Than Normalized Bandwidth Resources (Steps 613 and 625).

In step 613, the scheduler compares the queue size of the selected MS with the final normalized bandwidth set in step 612. If the queue size is smaller than the normalized bandwidth, the scheduler allocates a minimum normalized bandwidth enough to transmit the data of the queue in step 625.

G. Derive Number of Subchannels and MPR Based On Headroom (Step 615).

If the queue size is larger than the normalized bandwidth in step 613, the scheduler selects a combination of an MPR and the number of subchannels with respect to the normalized bandwidth in step 615. Even though the same normalized bandwidth is allocated according to the preference of the MCS level determined by the scheduler, the power consumption of the MS and the amount of resources available to the BS vary. Hence, an appropriate MPR-subchannel number combination is found within a headroom-supported range according to the scheduling method. If the current normalized bandwidth cannot be supported by any MPR-subchannel number combination with a headroom above the headroom requirement, the MPR is set to 0.

H. Reduce Number of Allocated Subchannels in Case of Headroom Shortage (Steps 617 and 627).

In step 617, the scheduler checks the MPR that is determined in step 615. If the MPR is less than or equal 0, i.e. the MPR calculated according to the headroom with respect to the normalized bandwidth is 0, this implies that the headroom is smaller than a threshold. Therefore, the scheduler detects an acceptable normalized bandwidth by reducing the normalized bandwidth, for example in half in step 627.

I. Process in Case of Fewer Remaining Subchannels than Allocated Subchannels (Steps 619, 629 and 631).

If the MPR is greater than 0 in step 617, in step 619 the scheduler compares the remaining subchannels with the number of subchannels decided in step 615. If fewer subchannels remain than the allocated subchannels, the scheduler allocates the remaining subchannels to the selected MS and sets a variable indicating the number of the remaining subchannels to 0 in step 629. In step 631, the scheduler determines a new MPR with respect to the number of the allocated subchannels. That is, the number of allocated subchannels and Inst_Alloc_Sch are set to the number of the remaining subchannels and the MPR is changed to a maximum available value. One thing to note herein is that the MPR shall be a minimum MPR enough for transmitting in the normalized bandwidth that was allocated such that Inst_Alloc_SchxMPR does not exceed Alloc_Nor_BW.

J. Calculate Number of Remaining Subchannels and Update Scheduling Metric (Steps 621 and 623).

If more channels remain than the allocated subchannels in step 619, the scheduler decreases the remaining subchannels by the number of the allocated channels in step 621. If fewer channels remain than the allocated subchannels in step 619, the number of the remaining channels is 0 in step 629. In step 623, the scheduling metric is updated by updating Avg_Alloc Sch and Avg_Alloc_BW for every MS. Then scheduling is repeated with the remaining subchannels, considering also the previously selected MSs as candidates.

In accordance with the uplink scheduling apparatus and method in the OFDMA-TDD BWA communication system according to the present invention as described above, an MS having a high channel gain is selected at a given time instant by use of downlink channel information on the uplink. Therefore, uplink capacity is increased. Also, as resources are fairly distributed to MSs according to their amounts of allocated resources and their throughputs, fairness is ensured among the MSs.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for an uplink scheduling in a communication system, comprising the steps of:
    selecting a Mobile Station (MS) from among a plurality of MSs, using downlink channel information by giving priority to an MS having highest ratio of an instant channel quality to a moving average channel quality from among the plurality of MSs;
    determining an amount of resources to be allocated and a throughput for the selected MS; and
    allocating the resources to the selected MS according to the determination,
    wherein the downlink channel information includes a relative ratio between an instant value and an average value of a Modulation order Product coding Rate (MPR).

2. A method for an uplink scheduling in a communication system, comprising the steps of:
    calculating a scheduling metric for each Mobile Station (MS);
    selecting an MS with a high priority level according to the calculated scheduling metric;
    determining a number of available subchannels and a product of a modulation order and a coding rate (MPR) according to input variables for the selected MS;
    determining a number of subchannels to be allocated to the selected MS from among the number of available subchannels, according to the MPR;
    allocating the number of subchannels to the selected MS; and
    updating the scheduling metric for each MS.

3. The method of claim 2, wherein the scheduling metric calculating comprises the step of calculating the scheduling metric by $$Metr(n)=\{C(n)\}^{60} \cdot \{F(n)\}^{\beta},$$

where Metr(n) denotes the scheduling metric for the each MS, C(n) denotes a channel metric, F(n) denotes a fairness metric, and α and β are weights for the channel metric and the fairness metric, respectively.

4. The method of claim 2, wherein the input variables include information about the headroom of the MS at the moment when the MS transmits a data burst according to a current Modulation and Coding Scheme (MCS) level and a current number of subchannels.

5. The method of claim 2, wherein the extracting step comprises the step of finding a combination of the MPR and the number of subchannels within a range supported by the input variables.

6. A method for an uplink scheduling in a communication system, comprising the steps of:
    updating input variables for scheduling and a scheduling metric for each Mobile Station (MS) in each frame;
    selecting an MS maximizing the scheduling metric and allocating predetermined band resources to the selected MS;
    allocating a minimum bandwidth sufficient enough to transmit data in a queue of the selected MS to the selected MS, if the size of the queue is less than the allocated band resources;
    determining a combination of the product of a modulation order and a coding rate (MPR) and the number of subchannels according to the input variables for the allocated band resources, if the queue size is larger than the allocated band resources;
    allocating the determined number of subchannels to the selected MS and reducing the number of remaining subchannels by the number of the allocated subchannels; and
    updating the scheduling metric for the each MS and repeating scheduling for the remaining subchannels.

7. The method of claim 6, wherein the scheduling metric calculating step comprises calculating the scheduling metric by $$Metr(n)=\{C(n)\}^{60} \cdot \{F(n)\}^{\beta},$$

where Metr(n) denotes the scheduling metric for the each MS, C(n) denotes a channel metric, F(n) denotes a fairness metric, and α and β are weights for the channel metric and the fairness metric, respectively.

8. The method of claim 7, wherein the channel metric C(n) is given by $$C(n) = \frac{\text{Inst\_DL\_MPR}[n]}{\text{Avg\_DL\_MPR}[n]},$$

where Inst_DL_MPR[n] denotes a maximum downlink MPR that can be allocated according to Channel Quality Information (CQI), Avg_DL_MPR[n] denotes a moving average MPR of instant downlink MPRs for frames corresponding to a time constant of an average downlink MPR.

9. The uplink scheduling method of claim 7, wherein the channel metric is a relative ratio between an instant MPR and an average MPR, the instant and average MPRs being derived from a Carrier to Interference and Noise Ratio (CINR) received on a CQI Channel (CQICH).

10. The method of claim 7, wherein the fairness metric F(n) is given by $$F(n) = \left(\frac{1}{\text{Avg\_Alloc\_Sch}[n]}\right)^a \cdot \left(\frac{1}{\text{Avg\_Throughput}[n]}\right)^b \cdot (\text{Queue\_Size}[n])^c,$$

where Avg_Alloc_Sch[n] denotes a moving average of an instant value of the number of allocated subchannels for frames corresponding to a moving average time constant, Avg_Throughput[n] denotes a moving average throughput for frames corresponding to a moving average time constant, for the each MS, Queue_Size[n] denotes the amount of data buffered in a transmission buffer for the each MS, estimated for scheduling, and a, b and c are weights for Avg_Alloc_Sch[n], Avg_Throughput[n], and Queue _Size[n], respectively.

11. The method of claim 6, further comprising, if the selected MS has been selected at least two times, neglecting a previously determined MPR and a previously determined number of subehannels for the MS and determining a new MPR and a new number of subchannels for the MS by summing band resources allocated to the MS.

12. The method of claim 6, wherein the band resources are a normalized bandwidth including as many subchannels as needed when a data burst is transmitted in Quadrature Phase Shift Keying (QPSK) at a coding rate of ½.

13. The method of claim 6, further comprising setting the MPR to 0 if the combination of the MPR and the number of subchannels does not support the allocated band resources.

14. The method of claim 6, wherein the input variables include information about the headroom of the MS at the moment when the MS transmits a data burst according to a current Modulation and Coding Scheme (MCS) level and a current number of subchannels,

15. The method of claim 6, further comprising:
  comparing the MPR with a predetermined threshold, after determining the MPR;
  reducing the band resources by a predetermined size, if the MPR is less than or equal to the threshold;
  comparing the determined number of subchannels with. the number of remaining, channels, if the MPR is greater than the threshold;
  allocating the remaining subchannels to the selected MS and setting the number of the remaining channels to 0, if the number of the remaining channels is smaller than the determined number of suhchannels; and
  changing the MPR to a maximum available value with respect to the number of the allocated subchannels.

16. An apparatus for uplink scheduling in a communication system, comprising:
  an uplink burst receiver for receiving a data burst from each Mobile Station (MS) and recovering the received data burst to a packet;
  a packet processor for classifying the packet as a traffic packet or a signaling message and acquiring first scheduling information required for scheduling the each MS by interpreting the signaling message, if the packet is the signaling message;
  a scheduler for selecting an MS to allocate uplink resources to according to the first scheduling information and determining second scheduling information to be allocated to the selected MS; and
  a MAP encoder for converting the second scheduling information to an uplink MAP (UL-MAP) message and transmitting the UL-MAP message to the selected MS, wherein the second scheduling information includes a number of subchannels and an modulation order and coding rate(MPR) with respect to the allocated resources, the number of subchannels and MPR is determined in correspondence with a required Signal to Interference and Noise Ratio (SINR) for each MPR and a required headroom for the each MPR.

17. The apparatus of claim 16, wherein the uplink burst receiver stores the second scheduling information received from the scheduler and processes a data burst received from the selected MS in correspondence with the stored second scheduling information.

18. The apparatus of claim 16, wherein the scheduler comprises:
  an input variable processor for receiving a signaling message received in each frame from the packet processor and updating input variables for scheduling according to the signaling message;
  a resource amount calculator for calculating the amount of resources required for control channels in accordance with the input variables;
  a resource allocator for determining the amount and position of resources to be allocated according to the input variables received from the input variable processor and the resource amount received from the resource amount calculator, and allocating resources to the control channels and traffic channels according to the determination;
  a metric processor for calculating a metric that prioritizes the each MS in scheduling according to a fairness level and whether downlink channel information is utilized;
  an MS selector for prioritizing the each MS according to the metric and selecting an MS to allocate uplink resources to according to the prioritization; and
  a subchannel number and the product of a modulation order and coding rate (MPR) decider for determining the number of subchannels and an MPR with respect to the allocated resources.

19. The apparatus of claim 18, wherein the metric processor calculates the metric by $$\text{Metr}(n) = \{C(n)\}^{60} \cdot \{F(n)\}^{\beta},$$

where Metr(n) denotes the scheduling metric for the each MS, C(n) denotes a channel metric, F(n) denotes a fairness metric, and α and β are weights for the channel metric and the fairness metric, respectively.

20. The apparatus of claim 19, wherein the channel metric C(n) is given by $$C(n) = \frac{\text{Inst\_DL\_MPR}[n]}{\text{Avg\_DL\_MPR}[n]},$$

where Inst_DL_MPR[n] denotes a maximum downlink MPR that can be allocated according to Channel Quality Information (CQI), Avg_DL_MPR[n] denotes a moving average MPR of instant downlink MPRs for frames corresponding to a time constant of an average downlink MPR.

21. The apparatus of claim 19, wherein the channel metric is a relative ratio between an instant MPR and an average MPR, the instant and average MPRs being derived from a Carrier to Interference and Noise Ratio (CINR) received on a CQI Channel (CQICH).

22. The apparatus of claim 19, wherein the fairness metric F(n) is given by $$F(n) = \left(\frac{1}{Avg\_Alloc\_Sch[n]}\right)^a \cdot \left(\frac{1}{Avg\_Throughput[n]}\right)^b \cdot (Queue\_Size[n])^c,$$

where Avg_Alloc_Sch[n] denotes a moving average of an instant value of the number of allocated subchannels for frames corresponding to a moving average time constant, Avg_Throughput[n] denotes a moving average throughput for frames corresponding to a moving average time constant, for the each MS, Queue_Size[n] denotes the amount of data buffered in a transmission buffer for the each MS, estimated for scheduling, and a, b and c are weights for Avg_Alloc_Sch[n], Avg_Throughput[n], and Queue_Size[n], respectively.

23. The apparatus of claim 18, wherein the input variables include information about the headroom of the MS at the moment when the MS transmits a data burst according to a current Modulation and Coding Scheme (MCS) level and a current number of subchannels.

24. The apparatus of claim 16, wherein the scheduler comprises an output variable processor for processing variables decided by scheduling to a message to be transmitted to the MS.

\* \* \* \* \*